United States Patent
Eneroth et al.

(10) Patent No.: US 7,593,359 B2
(45) Date of Patent: Sep. 22, 2009

(54) METHOD AND SYSTEM FOR FLOOR CONTROL FOR GROUP CALL TELECOMMUNICATIONS SERVICES

(75) Inventors: Goran Eneroth, Tyreso (SE); Per Synnergren, Lulea (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 460 days.

(21) Appl. No.: 10/595,641

(22) PCT Filed: Nov. 2, 2004

(86) PCT No.: PCT/SE2004/001584

§ 371 (c)(1),
(2), (4) Date: May 2, 2006

(87) PCT Pub. No.: WO2005/043944

PCT Pub. Date: May 12, 2005

(65) Prior Publication Data

US 2007/0133435 A1 Jun. 14, 2007

(30) Foreign Application Priority Data

Nov. 3, 2003 (SE) .................................... 0302920

(51) Int. Cl.
*H04H 1/00* (2006.01)
*H04B 7/00* (2006.01)
(52) U.S. Cl. ....................................... 370/312; 455/518
(58) Field of Classification Search ........................ None
See application file for complete search history.

(56) References Cited

U.S. PATENT DOCUMENTS

| | | | | |
|---|---|---|---|---|
| 6,263,066 B1 * | 7/2001 | Shtivelman et al. | .... | 379/266.06 |
| 7,319,879 B2 * | 1/2008 | Harris et al. | ................. | 455/458 |
| 7,366,780 B2 * | 4/2008 | Keller et al. | ................. | 709/227 |
| 2002/0077136 A1 | 6/2002 | Maggenti et al. | | |
| 2003/0078064 A1 | 4/2003 | Chan | | |
| 2005/0032539 A1 * | 2/2005 | Noel et al. | ................... | 455/518 |

OTHER PUBLICATIONS

Swedish Patent Office, International Search Report for PCT/SE04/001584, dated Jan. 27, 2005.

* cited by examiner

*Primary Examiner*—Wing F Chan
*Assistant Examiner*—Eunsook Choi (57) ABSTRACT

A telecommunications network (10) comprises a group call service server (18) which facilitates a group call over a radio interface (32) between different user equipment units (30) in a defined group within the telecommunications network. The group call service server (18) receives a floor request from a requesting user equipment unit (32*j*) included in the group, and handles the floor request based on a media type associated with the floor request. In conjunction with such handling, in one aspect of its operation the group call service server prioritizes the floor request from the user equipment unit based on the media type (e.g., based on delay sensitivity of the media type associated with the floor request). In one example implementation, the group call service server comprises a queue (42) and a floor request handler (40). The group call service server queues the floor request from the requesting user equipment in the queue (42); the floor request handler (40) prioritizes the floor request within the queue based on the media type. In a specific example implementation, the group call service is Push-to-Talk over Cellular (PoC) and the group call service server comprises PoC server situated in a service network. Also provided are a group call service which handles the floor request based on a media type, and a message format for the floor request itself.

8 Claims, 7 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|1 0 0 0 0|   PT=APP=204  |            length=3           |
+-+-+-+-+-+-+-+-+-+-+-+-+-+-+-+-+-+-+-+-+-+-+-+-+-+-+-+-+-+-+-+-+
|        SSRC of PoC Client requesting permission to send a talk burst |
+-+-+-+-+-+-+-+-+-+-+-+-+-+-+-+-+-+-+-+-+-+-+-+-+-+-+-+-+-+-+-+-+
|                          name=PoC1                            |
+-+-+-+-+-+-+-+-+-+-+-+-+-+-+-+-+-+-+-+-+-+-+-+-+-+-+-+-+-+-+-+-+
```

*Fig. 5*

METHOD AND SYSTEM FOR FLOOR CONTROL FOR GROUP CALL TELECOMMUNICATIONS SERVICES

BACKGROUND

1. Field of the Invention

The present invention pertains to telecommunications network, services, nodes, and devices, and particularly to those involved in group call services.

2. Related Art and Other Considerations

Public Land Mobile radio Network (PLMN) is a generic term for a mobile wireless network that is centrally operated and administrated by an organization and uses land-based radio frequency transmitters or base stations as network hubs. PLMNs can stand alone and interconnect with one another or connect to a fixed system such as the PSTN.

In the near future there will be an increasing traffic load on the packet switched part of the PLMNs, such as GSM/GPRS, UMTS (WCDMA) and CDMA2000. One service that utilizes packet switched bearers is referred to as Push to talk over Cellular (PoC). Push to talk over Cellular (PoC) is currently being standardized and agreed upon in an industry consortium known as the Open Mobile Alliance (OMA) forum. See, http://www.openmobilealliance.com/tech/wg_committees/poc.html and OMA PoC User Plane, OMA-UP-POC=V0_1-20041005-D, Draft Version 1.0.9 October 2004, incorporated herein by reference.

Push-to-talk over Cellular (PoC) is being developed for handsets (e.g., remote terminals) in networks such as GSM/GPRS networks, EDGE networks, UMTS, and CDMA systems. PoC is basically a voice chat for cellular telecommunication systems. PoC provides quick one-to-one or group communication, providing something like a short instant messaging service which feels like "walkie talkies".

PoC enabled handsets will most likely be equipped with a PoC-button. The PoC button may (for example) be: a dedicated hardware button; an assigned button on a standard keypad; or, a software button used in e.g. pressure sensitive screens. When the PoC button is pressed, the handset is connected directly to another user or user group. The first releases of PoC provide half-duplex service, although full duplex may be available at a later stage.

Combinational services enrich the Circuit-Switched (CS) voice service of today, with images and video-clips. The images and/or video-clips would utilize the packet switched (PS) part of the PLMNs when being transferred from one user's client to another user's client.

Much effort and investment has been made to develop a fully packet switched solution for voice communication. Such solution is often referred to as Voice over IP (VoIP) since it is assumed that the Internet Protocol (IP) will be used to carry the media. Now this work will be reused to further enhance VoIP. It is anticipated that in the near future it will be possible to offer combinations of, for example, PoC with video and/or images, and VoIP with video and/or images, even over current deployed PLMNs.

Like a "walkie-talkie", the voice communication in the PoC service is half-duplex, which means that media can only be sent when a PoC "client", (e.g., remote terminal, mobile station, handset, or user equipment unit ("UE")) is not receiving media. It is the infrastructure of PoC (e.g., a PoC server) that makes sure that the service is half-duplex by rejecting attempts of a PoC client to send while the PoC client is receiving media. One of the main reasons why half-duplex communications is preferred in PoC, is that the speech from one user can easily be multiplied by the infrastructure and sent to many users in a group (thereby enabling group communication) without the need of an expensive teleconferencing system that performs transcoding.

The PoC infrastructure controls which user that has the right to speak through a request/response mechanism known as "floor control". Basically, in floor control a user who wishes to speak makes a request (through his/her user equipment unit (UE)) for the right to speak, and then waits for a response that either grants or denies the user's request. In accordance with early PoC proposals, the floor is granted only for talk burst on a first received basis, and no queuing of floor control messages is performed.

Floor control uses source and destination ports (in the UE and PoC servers) negotiated at establishment of a Session Initiation Protocol (SIP) session. SIP is described in such publications as: (1) Rosenberg, J. et. Al., "SIP: Session Initiation Protocol", RFC3261, Internet Engineering Task Force, June 2002; and (2) Handley, M., Schulzrinne, H., Schooler, E. and Rosenberg, J., SIP: Session Initiation Protocol, IETF RFC 2543, 2000), both of which are incorporated herein by reference in their entirety.

PoC floor control is discussed, e.g., in the following documentation: (1) Push-to-Talk over Cellular (PoC) User Plane; Transport Protocols; PoC Release 2.0 (2004-05); (2) Push-to-Talk over Cellular (PoC) User Plane; Transport Protocols; PoC Release 1.0 (2004-10); and, OMA PoC User Plane, OMA-UP-POC=V0_1-20041005-D, Draft Version 1.0.9 October 2004, incorporated herein by reference, all of which are incorporated herein by reference in their entireties.

Among the foregoing documents, section 5.2 of Push-to-Talk over Cellular (PoC) User Plane; Transport Protocols; PoC Release 2.0 (2004-05) describes the main floor control procedure to request the access to the PoC media resource, which is called the Floor Request Procedure. The Floor Request Procedure utilize four floor control messages. The four floor control messages are shown in Table 1.

TABLE 1

PoC FLOOR CONTROL MESSAGES

| Message Name | Message Function |
|---|---|
| Floor Request | A UE requests that the Controlling PoC server shall allocate the media resources to his/her device. |
| Floor Grant | The Controlling PoC server notifies the UE that it has been granted the floor and therefore has been granted permission to use the media resource. |
| Floor Taken | The Controlling PoC server notifies all UEs, except the UE that has been granted the floor that the floor has been granted to another UE. In the case of early session the Floor Taken is also used as an indication of the beginning of the PoC session for the terminating UE. Also the the real or anonymous identity of the user that has been granted permission to use the media resource is communicated in the message. |
| Floor Deny | The Controlling PoC server notifies a UE that it has been denied permission to use the media resource. |

In section 5.2 of Push-to-Talk over Cellular (PoC) User Plane; Transport Protocols; PoC Release 2.0 (2004-05) the transport protocol UDP is used to convey the four messages. Within UDP, the application layer protocol of RTCP is used to convey these four floor control messages. The floor control message transport mechanism may in the future be implemented using different transport and application protocols. Other examples of protocols that may be used are: the Binary Floor Control Protocol (BFCP) and the Message Session Relay Protocol (MSRP). BFCP is described in: Camarillo, G.

et. Al., "The Binary Floor Control Protocol (BFCP)", draft-ietf-xcon-bfcp-02, Internet Engineering Task Force, October 2004. MSRP is described in: Campbell, B. et. Al., "The Message Session Relay Protocol", draft-ietf-simple-message-sessions-09, Internet Engineering Task Force, October 2004. Regardless of transport mechanism, the floor control protocol is built on a request/grant model. A Floor Request message should always be responded to by a Floor Grant, Taken or Deny message.

As indicated above, with early proposals the floor was granted only for talk burst on a first received basis, and no queuing of floor control messages was performed. Initially no meeting chair functionality or prioritizing between media types existed in the PoC infrastructure Queuing of floor requests was subsequently incorporated in OMA PoC User Plane, OMA-UP-POC=V0_1-20041005-D, Draft Version 1.0.9 October 2004.

Future evolutions of PoC likely will be true multimedia services in which voice, images, text and video may be sent. For instance, instant messaging is a candidate to be included in the next PoC standard. When mixing such media (like text, images and speech, for example) the PoC service may not have to be a strictly half-duplex service. Moreover, users involved in a PoC session (either one of the services that involves several users such as in a group talk, or only two users as in a personal PoC call) may want to communicate to the other users by either voice, text, images or through a video clip.

One problem facing future implementation of true multimedia services in PoC is that users perceive the media types differently from a delay perspective. For instance, users in a voice communication are more delay sensitive than users using a messaging service. Therefore, it would be unfortunate if a large text message were to delay voice frames in the multimedia PoC case.

The floor control of PoC today, as described, e.g., in the foregoing documentation, is strictly half-duplex. The half-duplex nature of PoC floor control means that a UE cannot send any media while receiving media. The half-duplex nature of PoC floor control makes sense for strictly voice communications, but if someone were to begin to send a large image, such action of image sending should not block the voice traffic for the session.

What is needed, therefore, and an object of the present invention, is an improved technique for handling floor request in a group call service such as PoC, for example.

BRIEF SUMMARY

A telecommunications network comprises a group call service server which facilitates a group call over a radio interface between different user equipment units in a defined group within the telecommunications network. The group call service server receives a floor request from a requesting user equipment unit included in the group, and handles the floor request based on a media type associated with the floor request. In conjunction with such handling, in one aspect of its operation the group call service server prioritizes the floor request from the user equipment unit based on the media type (e.g., based on delay sensitivity of the media type associated with the floor request).

In one example implementation, the group call service server comprises a queue and a floor request handler. The group call service server queues the floor request from the requesting user equipment in the queue; a floor request handler prioritizes the floor request within the queue based on the media type.

In a specific example implementation, the group call service is Push-to-Talk over Cellular (PoC) and the group call service server comprises PoC server situated in a service network.

In two other of its aspects, the invention concerns a group call service which handles the floor request based on a media type, and the floor request itself. In the latter regard, the floor request comprises a floor request message which includes an indication of the media type associated with the floor request and/or (optionally) an indication of message size. One or both of the indication of the media type and indication of message provide inputs to the group call service for handling the floor request.

Advantageously, the requesting user equipment unit is configured so that, while the requesting user equipment receives a first service, a second media service which is associated with the request can be uploaded to the group call service server.

The group call service server handles the floor request independently of application and/or transport protocols used as transport mechanism for the floor control messages used in the Floor Request Procedure.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures.

Figure 1A:
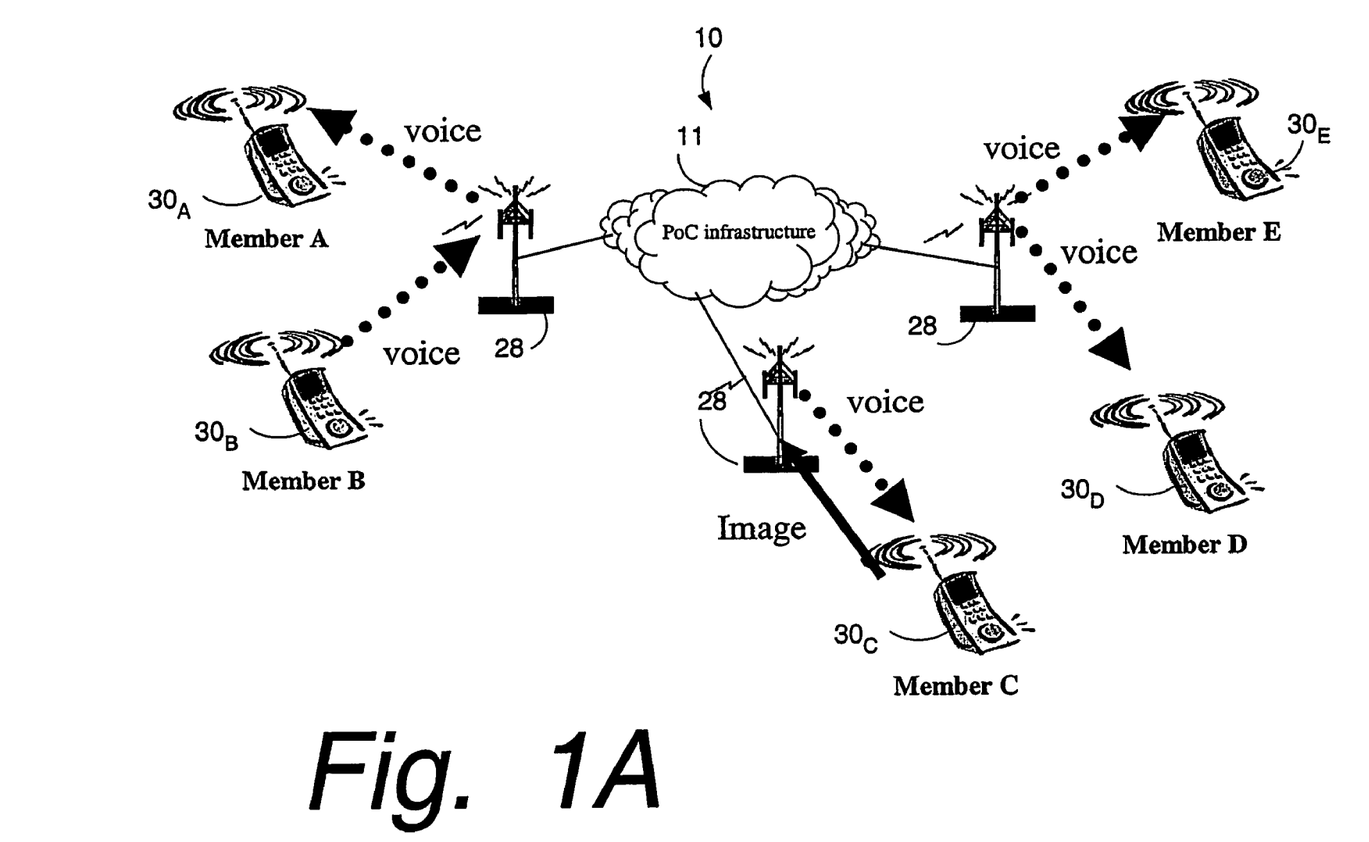
FIG. 1A, FIG. 1B, and FIG. 1C are diagrammatic views illustrating, in a group communication scenario involving voice and images, sequential phases of transmission and handling of a floor request.

FIG. 1A illustrates a telecommunications network 10 wherein group call service infrastructure, generically represented by cloud 11, connects to plural radio base stations 28. The group call service hosted by the group call service infrastructure 11 facilitates a group call over a radio interface between different user equipment units 30 in a defined group within the telecommunications network. In particular, in the example scenario shown in FIG. 1A, participants in the group call include member A at user equipment unit $30_A$, member B at user equipment unit $30_B$, and so forth to member E at user equipment unit $30_E$. The group call service infrastructure receives a floor request from a requesting user equipment unit included in the group, and advantageously handles the floor request based on a media type associated with the floor request (rather by the conventional practice of handling floor requests on a first come, first served basis).

Figure 1B:
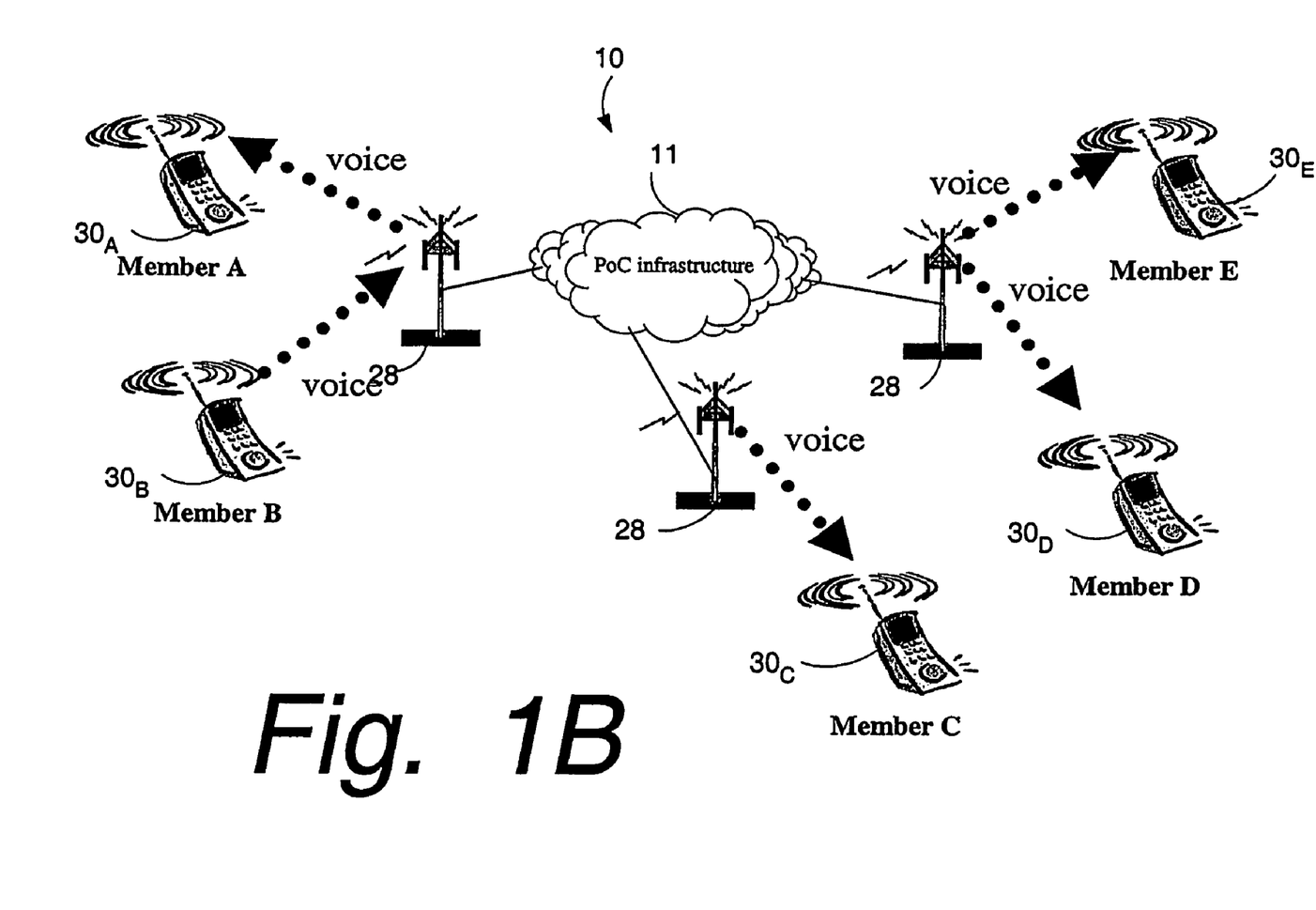
Figure 1C:
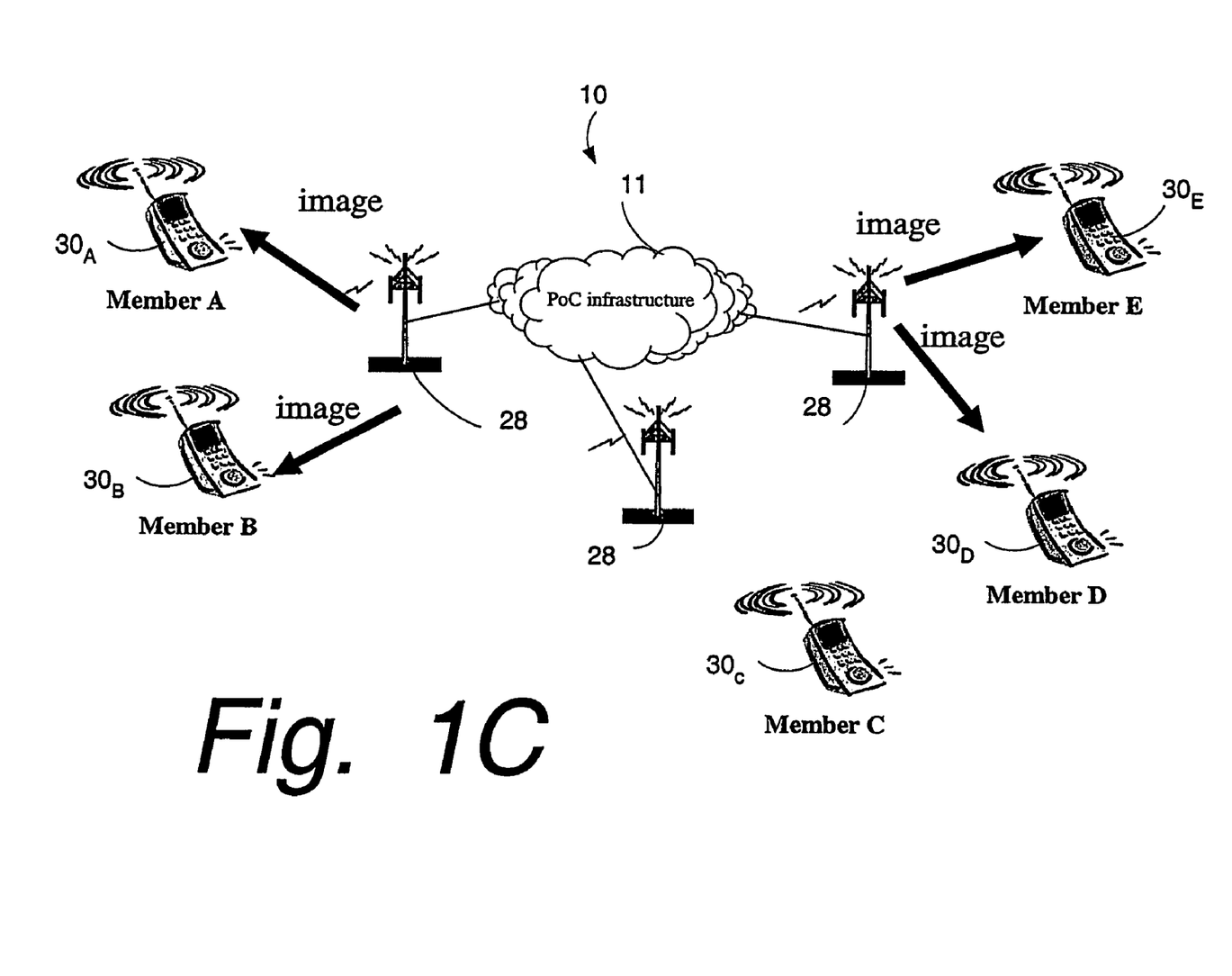

FIG. 1A, FIG. 1B, and FIG. 1C illustrate, in a group communication scenario involving voice and images, sequential phases of transmission and handling of a floor request. In particular, FIG. 1A illustrates a group call service session in which Member B talks, but with Member C wanting to provide the other members with an image containing some information. Hence, Member C pushes the push-to-talk (PTT) button or a comparable button, switch or key, on his/her user equipment unit, and thereby sends the image (with or as part of an associated floor request message) to the group call service infrastructure 11 even though Member C is essentially contemporaneously receiving voice from Member B. FIG. 1B illustrates that the image from Member C is buffered in the group call service infrastructure 11 while Member B continues to talk. FIG. 1C illustrates that, after the talk burst from Member B has ended, the image which has been uploaded from Member C to group call service infrastructure 11 (e.g., in FIG. 1B) is distributed to the members of the session.

As used herein, the group call service infrastructure 11 can be a network, node, portion of node, or collection of (portions) of nodes which lie across an air or radio interface from the user equipment units of the defined group, and therefore is generically depicted graphically as a cloud. In some example implementations, the group call service infrastructure 11 comprises a group call service server (such as a PoC server, for example).

The use and handling of the floor request message with its associated image in the advantageous manner described in FIG. 1A-FIG. 1C results from an enhancement to the group call service and to group call service infrastructure 11 which permits the group call service infrastructure 11 to queue floor control messages (e.g., floor request messages) and media, and in such queuing to afford (differing) priorities to differing media types. The group call service uses a special service dependent infrastructure (e.g., group call service infrastructure 11) to allow group calls between different members in a defined group within a telecommunication network. The group call services interacts with infrastructure 11, with the group call service infrastructure 11 including or implementing chair functionality or prioritizing between different media types. The group call service uses a mechanism to request and grant the right to transmit media and is independent of the application and transport protocols used for that purpose. In example illustrated embodiments, the infrastructure 11 includes a server or the like in which queuing of floor control messages and media is allowed and different media types are given different prioritizing in the queue. Messages utilized in the group call service include media identifying fields in the appropriate floor control messages and allow for queuing of the floor control messages in the infrastructure and also allows for queuing of the floor control messages in the handset (user equipment unit) and allow for media buffering in the group call service server.

Figure 2:
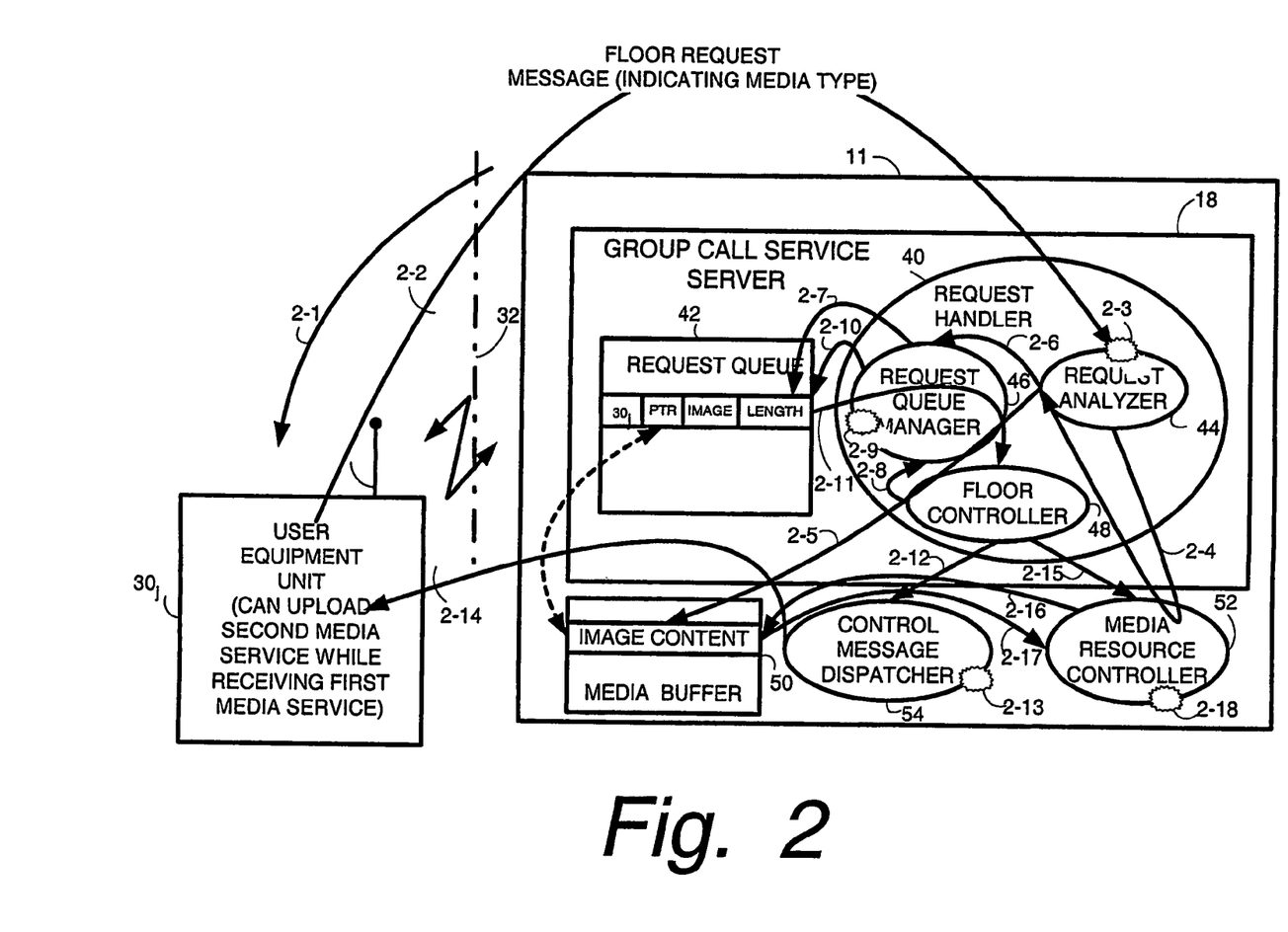
FIG. 2 is a diagrammatic view of example constituent components and/or functionalities of an example implementation of a server which facilitates the inventive floor request handling techniques.

FIG. 2 shows more details of an example implementation of portions of the group call service infrastructure 11 (particularly of a group call service server 18) and an example user equipment unit 30. In the example implementation, the group call service server 18 includes a request handler 40 and request queue 42. The request handler 40 includes, e.g., the following functionalities or units: request analyzer 44; request queue manager 46; and floor controller 48. In addition to request handler 40, group call service infrastructure 11 also includes media buffer 50, media resource controller 52, and control message dispatcher 54.

In FIG. 2 the group call service infrastructure 11 is shown as being situated across an air or radio interface 32 from one of the constituent members of a defined group, in particular user equipment unit 30j. As understood from a previous discussion, it should be understood that group call service infrastructure 11 need not necessarily be situated in or comprise a node which directly terminates the radio link. Rather, the group call service infrastructure 11 can be one or more nodes removed from a radio link-terminating node, and could reside either in a radio access network, core network, or service network, and could be centralized at one such node or distributed to plural nodes. One purpose of FIG. 2 is to show two entities involved in the floor request sending and handling, e.g., user equipment unit 30j and the group call service server 18.

In addition, FIG. 2 shows various actions and events which occur in the telecommunications system 10 which facilitates the group call service, in the group call service infrastructure 11 itself (e.g., in group call service server 18), and in the user equipment unit 30 which belongs to the defined group and participates in the group call service.

In the above regard, FIG. 2 shows as event 2-1 the user equipment unit 30 receiving a first media service, which may be (for example) a voice service (e.g., voice transmission) from an unillustrated other member of the defined group to which the illustrated user equipment unit 30 belongs. Event 2-2 illustrates the user equipment unit 30 (the "requesting" user equipment unit) sending a floor request to group call service infrastructure 11 (e.g., to group call service server 18). The floor request of event 2-2 can be sent successfully to group call service server 18 after the voice service of event 2-1 has completed (as conventionally occurs), or (by virtue of the advantages of the enhanced group call service) the floor request of event 2-2 can efficaciously be sent contemporaneously with event 2-1, e.g., while another user has been granted the floor and the requesting user equipment unit 30 is receiving the first media service.

Consistently with the example of FIG. 1B, the particular floor request sent as event 2-2 of FIG. 2 is a request to send content of a second service, e.g., an image or text, to the members of the defined group. The floor request of event 2-2 is originated by the member of the defined group (in possession of requesting user equipment unit 30) initiating some action, such as by pushing a push-to-talk (PTT) button or a comparable button, switch or key, on his/her user equipment unit.

The floor request of event 2-2 comprises a floor request message which includes an indication of the media type associated with the floor request, and/or (optionally) an indication of message size. One or both of the indication of the media type and indication of floor request message of event 2-2 provide inputs to the group call service for handling the floor request.

In one mode of operation, the floor request message includes or has attached thereto the informational content (e.g., the actual text or image information) which the requesting user equipment unit 30 wants to send to the other members of the defined group. In another mode of operation, the floor request message does not include such informational content (e.g., the actual text or image information), but instead includes only the indication of the media type associated with the floor request and/or (optionally) the indication of message size.

The floor request message of event 2-2 is forwarded by group call service infrastructure 11 to the request analyzer 44 of group call service server 18. As event 2-3, request analyzer 44 examines the received request message. In conjunction with the examination of event 2-3, request analyzer 44 determines that the received request message is a floor request message and ascertains from the floor request message the media type associated therewith (e.g., that requesting user equipment unit 30 wants to send information to other members of the defined group using a second media service).

Knowing the type of media included in or associated with the floor request message, as event 2-4 the request analyzer 44 consults media resource controller 52 to ascertain whether sufficient resources presently exist to accommodate a session of the particular media type requested by the floor request message. The round-trip arrow which depicts event 2-4 shows the case in which the media resource controller 52 affirms that sufficient resources do presently exist, in which case handling of the floor request message continues as described hereinbelow. Otherwise, the group call service server 18 issues a floor deny message to the requesting user equipment unit 30.

With it now confirmed that sufficient resources exist to process the media type involved with or associated with the floor request message, the request analyzer 44 can proceed in accordance with either of the two modes discussed above. In the first mode the group call service server 18 obtains from the floor request message itself the informational content (e.g., the actual text or image information) which the requesting user equipment unit 30 wants to send to the other members of the group, and thus has such informational content presently on hand. In the second mode, additional messages are involved for the group call service server 18 to give permission for the requesting user equipment unit 30 to send the informational content (e.g., the actual text or image information) to the group call service server 18, and for the requesting user equipment unit 30 to send such informational content. The second mode is more appropriate for real-time media (sent by RTP) as voice and video. When requesting the floor for voice and video bursts, one uses a method very similar to conventional PoC of today. In other words, an RTCP floor request message is followed by an RTCP floor granted message. However, the first mode may be implemented, at least in part, for certain types of media such as images. Images can be sent using Message Session Relay Protocol (MSRP). In MSRP one can send a MSRP SEND request to the server with potentially a part of the image (probably a small part of the image, or it may not carry any part of the image). The MSRP SEND request is then acknowledged by a MSRP 200OK message. If the user equipment unit (UE) receives the acknowledgement (MSRP 200OK), the UE sends yet another part of the image. If the server decides that his is a bad time for this image transfer, it can answer back with a MSRP 4xx or 5xx message saying that this transfer is stopped (denied). Thus, at least for image/text transfer, the first mode is appropriate, at least in part.

The ensuing discussion assumes that the first mode is operative, or that the group call service server 18 otherwise now has access to or (for the second mode) has acquired the informational content (e.g., the actual text or image information) which the requesting user equipment unit 30 wants to send to the other members of the group. As such, as event 2-5 the request analyzer 44 or other functional unit of group call service server 18 sends the informational content associated or included with the floor request message to media buffer 50. In particular, the request analyzer 44 sends the informational content to an address specified by a buffer pointer known or communicated to request analyzer 44.

Also, as event 2-6, the request analyzer 44 sends the floor request message to request queue manager 46. As event 2-7 the request queue manager 46 stores the floor request message received from requesting user equipment unit $30_j$, or a record or an entry derived or modified therefrom, in request queue 42. For sake of simplicity, the record or entry stored in request queue 42 is depicted in FIG. 2 as including a field which indicates which defined group member sent the floor request message (member $30_j$); a field which identifies the pointer (PTR) in media buffer 50 to the corresponding informational content of the floor request message; a field which indicates the type of media associated with the floor request message; and, a length of the media content associated or included in the floor request message. It will be appreciated that other fields and other types of information can also be stored with respect to the floor request message or record therefor in request queue 42.

In storing or retrieving the floor request message or record of information derived therefrom or pertaining thereto in request queue 42, the request handler 40 prioritizes the floor request from the user equipment unit based on the media type (e.g., based on delay sensitivity of the media type associated with the floor request). By "prioritizing" is meant that the request queue manager 46 either stores an entry corresponding to the floor request message in request queue 42 in accordance with a prescribed order or in accordance with prescribed logic or criteria, or alternatively (when determining which member is next to have the floor) the request queue manager 46 fetches or retrieves an entry from the request queue 42 in a prescribed order or in accordance with prescribed logic or criteria.

Event 2-8 shows floor controller 48 communicating to request queue manager 46 that floor controller 48 has determined that it is timely to determine to whom (in the defined group) the floor should next be granted. Event 2-9 depicts the request queue manager 46 executing its logic or otherwise evaluating the entries in request queue 42 using the criteria programmed or inputted into request handler 40. Event 2-10 depicts the request queue manager 46, or alternatively floor controller 48, selecting a floor grantee using the entries in request queue 42. As mentioned above, in a mode in which the entries in request queue 42 are stored or sorted in accordance with a predetermined logic or criteria, the granting entity (either request queue manager 46 or floor controller 48) may choose the top-queued entry. Alternatively, the granting entity may search appropriate fields of the entries in request queue 42 to ascertain the floor grantee. In any case, event 2-11 shows the floor grantee and information pertaining thereto (such as the contents of the corresponding entry or record).

Upon receiving the information identifying the floor grantee and the information pertaining thereto, as event 2-12 the floor controller 48 directs control message dispatcher 54 to send various messages as a consequence of selection of a new floor grantee. For example, under direction of floor controller 48 and as event 2-13 the control message dispatcher 54 sends a "floor taken" message to all members of the defined group except the floor grantee. Further, as event 2-14 the control message dispatcher 54 sends a "floor grant" message to the floor grantee. In the example scenario of FIG. 2 it so happens that the floor grantee is the requesting user equipment unit $30_j$, for which reason FIG. 2 shows the "floor grant" message of event 2-14 being sent to user equipment unit $30_j$.

With the floor grantee now having been explicitly been given the floor, as event 2-15 floor controller 48 next directs that media resource controller 52 send the media stream or text associated or included with the floor request message of the floor grantee to the members of the defined group. In so doing, the floor controller 48 provides the media resource controller 52 with pointer value (PTR) to the address in media buffer 50 at which the information content associated with the floor request message from the floor grantee is stored. Using such pointer value (PTR), as event 2-16 the media resource controller 52 fetches the information content associated with the floor request message from the floor grantee from media buffer 50. Event 2-17 shows the information content being returned to 52; event 2-18 depicts the information content associated with the floor request message from the floor grantee being distributed or broadcast to all members of the defined group.

A group call service server 18 such as that for which an example embodiment is provided above may be implemented using individual hardware circuits, using software functioning in conjunction with a suitably programmed digital microprocessor or general purpose computer(s), using an application specific integrated circuit (ASIC), and/or using one or more digital signal processors (DSPs). Moreover, it will be appreciated that the functionalities and units of group call service server 18 need not be as shown in FIG. 2, but that similar or analogous functions can be performed otherwise and by other units and that the steps shown in FIG. 2 and their order of implementation are provided merely as examples for describing the media type-dependent handling of floor request messages by group call service server 18.

As apparent from the foregoing, the group call service server handles the floor request independently of application and/or transport protocols used as transport mechanism for the Floor Control messages used in the Floor Request Procedure. The use of the application layer protocol RTCP over the transport protocol UDP is only one possible implementation; other possible protocols are MSRP over TCP and BFCP over TCP. For example, image media can probably use a TCP-based solution while voice can probably use the UDP transport protocol as described in existing in the PoC specifications. One session may use two different floor control transport mechanisms but one server entity may handle the logic for both media types.

From the foregoing it will be appreciated that different floor control messages are sent from and to group call service infrastructure 11 (e.g., group call service server 18) in order to Request/Grant/Deny the floor or inform that the floor for example is Taken. For example, in conjunction with floor request messages concerning different media services, the floor request message are different (for example) in that the indications of media type borne by the respective floor request messages are different indications.

The request queue 42 and its associated request queue manager 46 are illustrative in the example embodiment of the fact that the group call service server allows for queuing of floor request messages or records or entries derived therefrom for the purpose of making a future floor control decision.

Figure 3:
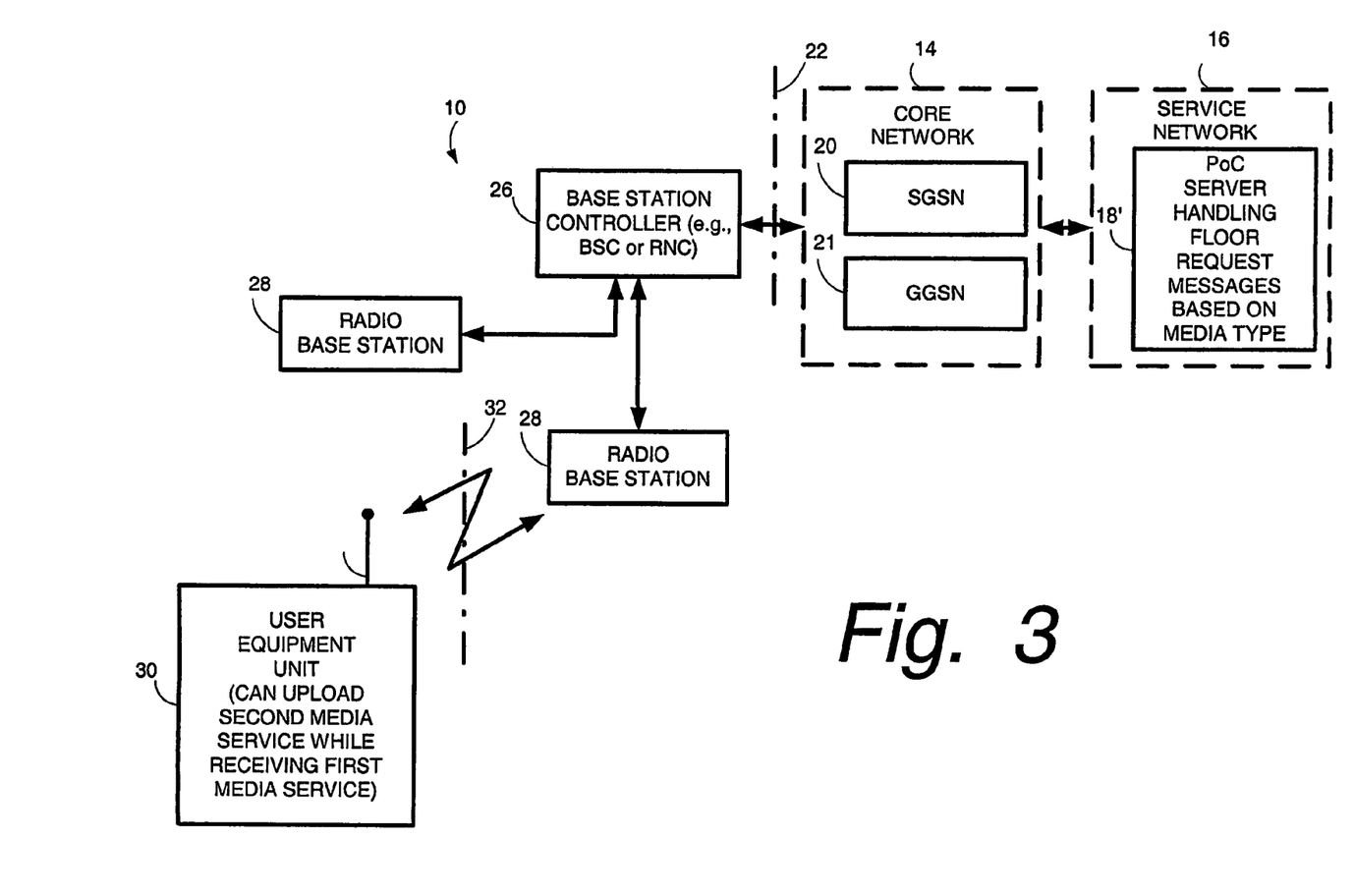
FIG. 3 is a schematic view of a generic telecommunications system with a radio access network which serves as an example context in which inventive floor request handling techniques may be employed.

FIG. 3 illustrates a generic telecommunications system as an example context in which the present invention may be employed. The example system of FIG. 3 includes both a radio access network 10 and a core network 14. The core network 114 is shown as being connected to a service node or service network 116. The service network 16 (or other comparable entity) includes a group call service server, which in the specific FIG. 3 embodiment is a PoC Server 18' which facilitates the Push to talk over Cellular (PoC) service previously described.

In one specific example implementation the core network 14 is a connectionless external core network and comprises Serving GPRS Support Node (SGSN) 20 and Gateway GRPS support node(GGSN) 21. The General Packet Radio Service (GPRS) Service (SGSN) node 20 is tailored to provide packet-switched type services. The Gateway GRPS support node (GGSN) 21 provides the interface towards the packet-switched networks (e.g., the Internet, X.25 external networks). The Gateway GRPS support node (GGSN) 21 translates data formats, signaling protocols and address information in order to permit communication between the different networks. Serving GPRS Support Node (SGSN) 20 provides packet routing to and from a SGSN service area, and serves GPRS subscribers which are physically located within the SGSN service area. Serving GPRS Support Node (SGSN) 20 provides functions such as authentication, ciphering, mobility management, charging data, and logical link management toward the user equipment unit. A GPRS subscriber may be served by any SGSN in the network depending on location. The functionality of Serving GPRS Support Node (SGSN) 20 and Gateway GRPS support node (GGSN) 21 may be combined in the same node, or may exist in separate nodes as shown in FIG. 3.

The core network 14 connects to radio access network 10 over a radio access network interface depicted by dot-dashed line 22. The radio access network 10 includes one or more control nodes 26 and one or more radio base stations (BS) 28. In an example, non-limiting implementation in which radio access network 10 is a UMTS Terrestrial Radio Access Network (UTRAN), the radio access network interface depicted by dot-dashed line 22 is known as the Iu interface, and the control nodes 26 take the form of radio network controllers (RNCs). In other implementations of radio access network 10, the control nodes 26 can have other names, such as base station controller (BSC), for example. In any event, it should be understood that, for sake of simplicity, the radio access network 10 of FIG. 3 is shown with only one control node 26, with the control node 26 being connected to two base stations (BS) 28. As understood by those skilled in the art, the radio access network 10 typically has numerous control nodes 26, which can be connected over an unillustrated interface (such as an Iur interface). Again for sake of simplicity, only two base station nodes 28 are shown connected to the representative control node 26. It will be appreciated that a different number of base stations 28 can be served by each control node 26, and that control nodes 26 need not serve the same number of base stations. Further, those skilled in the art will also appreciate that a base station is sometimes also referred to in the art as a radio base station, a node B, or B-node.

For brevity it is assumed in the ensuing discussion that each base station 28 serves one cell. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

The user equipment unit 30 communicates with one or more cells or one or more base stations (BS) 28 over a radio or air interface 32. In differing implementations, the user equipment unit 30 can be known by different names, such as wireless terminal, mobile station or MS, mobile terminal or MT, handset, or remote unit, for example. Of course, whereas for ease of illustration only one user equipment unit 30 is shown in FIG. 3, each base station typically serves many user equipment units.

In the example UMTS implementation mentioned above, radio access is preferably based upon Wideband, Code Division Multiple Access (WCDMA) with individual radio channels allocated using CDMA spreading codes. Of course, other access methods may be employed.

Thus, in the specific example implementation of FIG. 3, the group call service is Push-to-Talk over Cellular (PoC) and the group call service server comprises PoC server 18' situated in a service network. The PoC server 18' has the ability to handle floor request messages based on media type in essentially the same manner as the example group call service server described and discussed in conjunction with FIG. 2, and may be configured accordingly or be provided with other configurations which achieve the functionality herein described.

Figure 4:
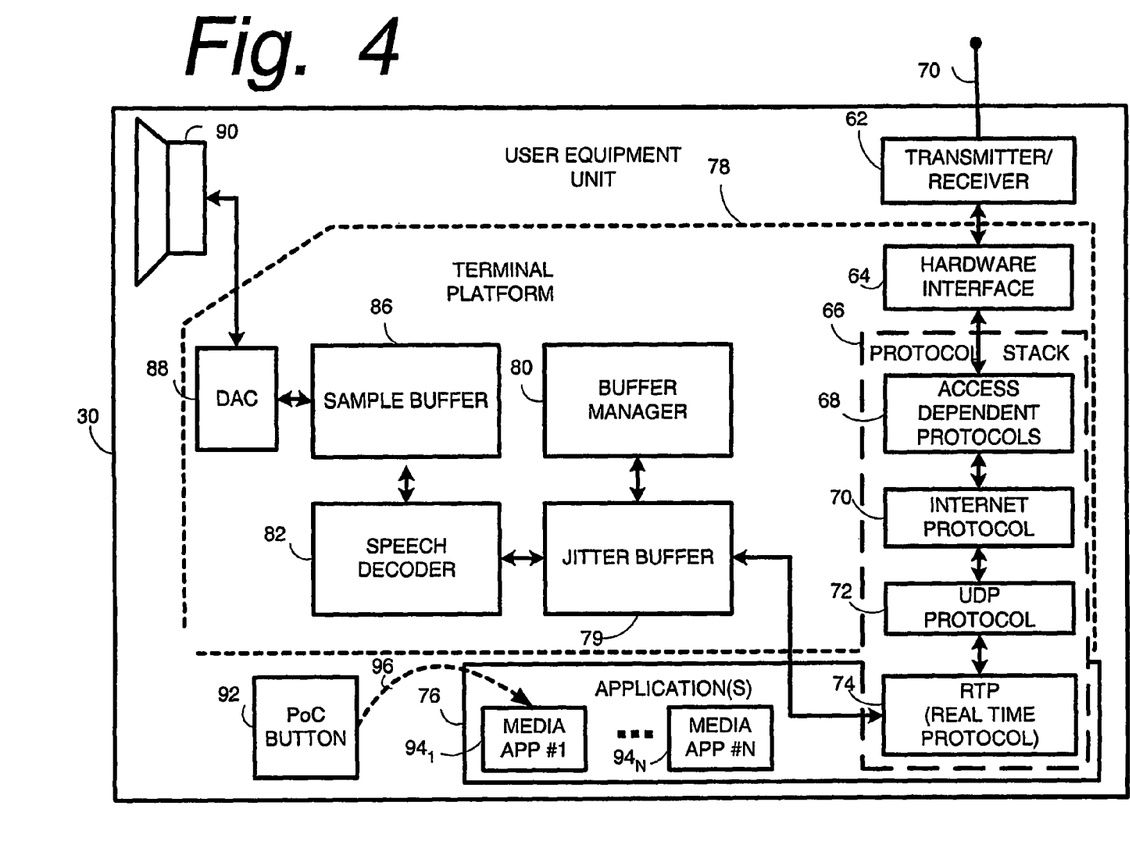
FIG. 4 is a schematic view of example constituent components of a generic representative user equipment unit involved in the inventive floor request handling techniques.

Example constituent components and functionalities of a generic representative user equipment unit 30 are illustrated in FIG. 4. The generic representative user equipment unit 30 comprises an antenna 70 which connects to a transmitter/receiver 62. The transmitter/receiver 62 is connected through a hardware interface 74 to a protocol stack 66. Frames of a media stream received over the air interface 31 by transmitter/receiver 62 are processed by protocol stack 66. The protocol stack 66 generally includes access dependent protocols; internet protocol; a transport protocol; and, an application protocol. The particular example protocol stack 66 shown in FIG. 4 happens to include access dependent protocols 68; Internet Protocol 70; UDP Protocol 72 (as the transport protocol); and Real Time Protocol (RTP) 74 (as the application protocol). The protocol stack 66 can be constructed differently in other implementations. In other embodiments, whether wireless or wireline connection, the protocol stack may have a different composition depending, e.g., upon the nature of the particular access technology (e.g., GSM/GPRS, WCDMA, Ethernet, etc). As an aside, the person skilled in the art will understand that often various additional techniques are employed to make Internet Protocol useful for mobile terminals, such as compression, P-headers in SIP, and so forth.

UDP (User Datagram Protocol) 62 is a transport service which is provided to a software application (such as application 76) that uses an IP network for communication. The UDP transport service provides additional functionality on top of the IP network transport function. UDP transport service operates end-to-end on a data flow. The UDP protocol 72 is not involved in intermediate nodes in the IP network, only the nodes where the data flow originates and terminates.

The Real Time Protocol (RTP) 74 is performed by an application 76. The application 76, like various other functionalities of a terminal platform portion 78 of user equipment unit 30 (including protocols in protocol stack 66), is preferably executed by one or more processors which comprise user equipment unit 30. In some example implementations, application 76 and jitter buffer 79 may be integrated into terminal platform 78. The application 76 serves, e.g., to remove RTP headers and to pass a frame and a timestamp of the frame to jitter buffer 79. Examples of applications which perform such functions are: network audio conferencing tools; network video conferencing tools; IP telephony tools; and packet switched streaming tools.

The terminal platform portion 78 of user equipment unit 30 includes the jitter buffer 79 which operates under control of a buffer manager 80. Under control of buffer manager 80, jitter buffer 79 stores data of the media stream in a way to smooth out interruptions in the media transfer, thereby preferably feeding speech decoder 82 with a continuous stream of data.

Also, jitter buffer 79 operating under control of buffer manager 80 performs re-ordering of packets (if needed), and removes or discards duplicate frames by using the timestamps of the frames.

The terminal platform portion 78 of user equipment unit 30 may also include a sample buffer 86 which is connected between speech decoder 82 and digital to analog converter (DAC) 88. The digital to analog converter (DAC) 88 is connected to media playback device(s) 90, such as a speaker or head-set (perhaps via, e.g., an amplifier).

The user equipment unit 30 also includes an input device (s), such as a PoC-button 92. The PoC button 92 may take the form (for example) of: a dedicated hardware button; an assigned button on a standard keypad; or, a software button used in e.g. pressure sensitive screens. When the PoC button 92 is pressed, the user equipment unit 30 is connected directly to another user or user group.

Myraid media stream applications may execute at the user equipment unit 30, as indicated by media applications $94_1$ through $94_N$ in FIG. 4. These applications can include, for example, voice applications, image applications, video applications, text chat applications. As depicted by arrow 96 in FIG. 4, by pushing the PoC button 92 the operator of user equipment unit 30 can send a floor request message to the group call service infrastructure and associate with the floor request message information content originated by one or more of the media applications.

Since it is apparent that the terminal may take either wireless or wired forms, it should also be apparent that the terminal may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc.

As indicated above, a media identifying field is included in the floor request message. The media identifying field defines or indicates to which media type the floor control message belongs. Such indication enables the group call service infrastructure 11 (e.g., request queue manager 46 or floor controller 48 in the FIG. 2 example embodiment) to choose voice communication over instant messaging in a race condition when two floor control messages carrying different media types is received almost simultaneously. In addition and optionally, the floor request message may include a field which indicates or states the size of the coming message (if available), which is possible for pre-stored images, typed text messages.

Figure 5:
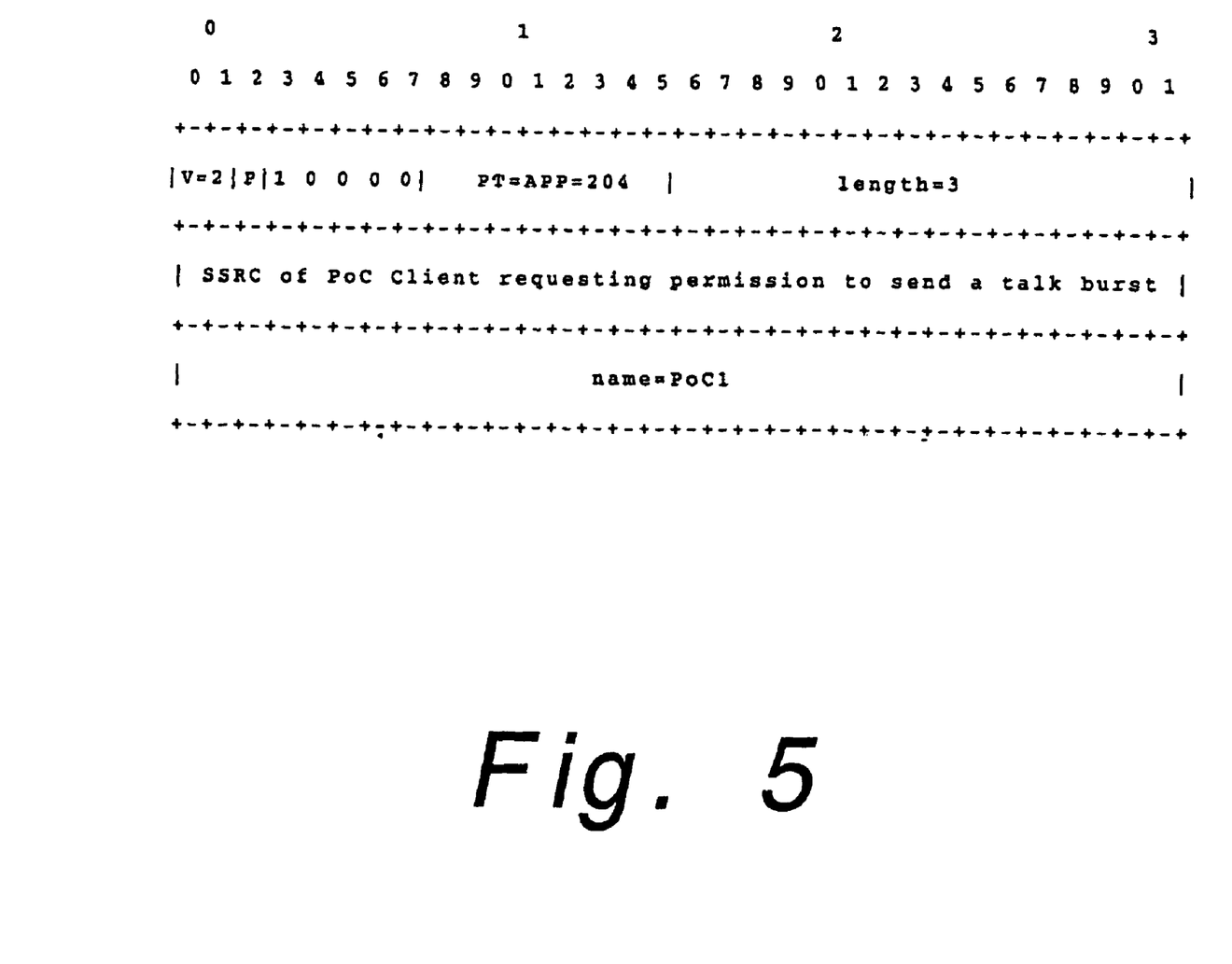
FIG. 5 is a diagrammatic view of an example format of a floor request message.

FIG. 5 shows a first example message format of a floor request message which includes media type parameters. The message format of FIG. 5 essentially resembles an existing PoC floor request message, but has a different usage of an existing field. For example, the third field in the message is changed. from a conventional value of "00000" to "10000" to indicate a particular media type (e.g. video).

The following shows a second example message format of a floor request message which includes media type and media length parameters:

MSRP dkei38sd SEND
To-Path:msrp://bob.example.com:8888/9di4ea;tcp
From-Path:msrp://alicepc.example.com:7777/iau39;tcp
Message-D: 456
Byte-Range: 1-10/8000
Content-Type: image/jpeg
ÿØÿà-JFIF
- - - dkei38sd+

The protocol for the foregoing is ASCII-based and not binary as the RTCP APP structure. The message is conveyed using a MSRP SEND request message. The field denoted Content-Type indicate a typical media type (e.g. image). The field denoted Byte-Range indicates the media length.

Advantageously, the requesting user equipment unit is configured so that, while the requesting user equipment receives a first service, a second media service which is associated with the request can be uploaded to the group call service server. This capability is now explained in the two different cases: the first case is sending/receiving an image and voice; the second case is sending/receiving video and voice.

In the first case of sending/receiving an image and voice, as a first subcase the user equipment unit 30 preferably has two radio access bearers connected to it or operative. As a second subcase, the user equipment unit 30 may have three radio access bearers; as a third subcase the user equipment unit 30 may have one radio bearer.

In the first subcase of the first case, the user equipment unit 30 has the two radio access bearer configuration: Radio access bearer #1 is of an "interactive" type and should be used for PoC session signaling (SIP) and image transfer. Radio access bearer #2 if of a "streaming" or "conversational" type and is used for the PoC voice. The voice is sent over a radio access bearer (#2) which is prioritized and have a guaranteed bitrate in order to guarantee a continuous media stream and low latency. The image should be sent over radio access bearer #1 which allows for multiplexing gains since no guaranteed bitrate is promised. This means that many users can share the radio resources and that they get what ever bitrate is available when they need to send PoC session signaling or an image. Interactive types of bearers are optimized for e-mail downloading, web-surfing (TCP traffic in general) and session signaling.

In the second subcase of the first case, the user equipment unit 30 has the two radio access bearer configuration: Radio access bearer #1 should be of the "interactive" type and is used for PoC session signaling (SIP). Radio access bearer #2 is of the "streaming" or "conversational" type and is used for the PoC voice. Radio access bearer #3 is of the "interactive" type using another traffic handling priority than radio access bearer #1 and should be used for image transfer. The voice is sent over a radio access bearer (#2) which is prioritized and has a guaranteed bitrate in order to guarantee a continuous media stream and low latency. The image is sent over radio access bearer #3 which has another priority than radio access bearer #1. Then an implementation can choose to have lower or higher priority on the image transfer than for the PoC session signalling (lower is preferred).

In the third subcase of the first case, the user equipment unit 30 has the one radio access bearer configuration: Radio access bearer #1 is of the "interactive" type and is used for PoC session signaling (SIP), voice and image transfer. This is not a preferred case at all since both signaling and image transfer will interfer with the voice. However, given a very high bitrate radio channel (read HSDPA, max 14 Mbps) this may be a possible configuration.

In the second case of sending/receiving video and voice, the user equipment unit 30 should operate with two radio access bearers. Radio access bearer #1 is of the "interactive" type and is used for PoC session signaling (SIP). Radio access bearer #2 is of the "streaming" or "conversational" type and is used for the PoC voice and video. The voice and video are sent over a radio access bearer (#2) which is prioritized and has a guaranteed bitrate in order to guarantee a continuous media stream and low latency. The negotiated guaranteed bit rate is in this case higher than for Case 1 since both video and voice is sent over the same "bit pipe".

Features and advantages provided by the described structure and operation are the following:

- The user equipment unit 30 can transmit a request to send media (for instance, an image) at any point in time and such request shall not be dropped if the group call service infrastructure is currently receiving/transmitting media.
- Different types of floor request messages may be treated differently by the group call service infrastructure in accordance with the logic or criteria of the group call service infrastructure (e.g., of request queue manager 46 or floor controller 48). For instance, a request to transmit voice may be dropped if the group call service infrastructure is currently receiving/transmitting media, but a request to send an image may not be dropped.
- The prioritizing mechanism which operates on the queue (e.g., request queue 42) can give a higher priority to more delay sensitive media types. For example, if requests to send voice are also stored such voice requests should be prioritized over requests to send images. A prioritizing scheme can take into consideration all allowed media types for the service.
- The user equipment unit 30 is configured and allowed to generate and send the floor control messages (e.g., floor request messages) with the media identifying fields.
- The user equipment unit 30 may (for instance) upload non-delay sensitive media (e.g. text, images) to the group call service infrastructure server even during the time the same user equipment unit receives another transmission (for instance, a voice service).
- The group call service infrastructure allows media buffering (e.g., in 50).
- If a non-delay sensitive media is uploaded from the user equipment unit 30 as described in the text above, the group call service infrastructure shall buffer such text and transmit it when the infrastructure has concluded that the previous media transmission is over and the floor is not taken any longer.

A further advantage includes giving each user the chance to make him/her heard, without any particular user interaction (remember that floor handling could also have been with only user interaction).

Another advantage is enabling floor control between different media types with different priorities and delay requirements. This prevents the need for resource separation and priority at the radio network. Instead the separation, priority and queuing is handled in the infrastructure with an extended floor control mechanism.

While the invention has been described in connection with what is Presently considered to be the most practical and preferred embodiment, it is to be understood that the invention is not to be limited to the disclosed embodiment, but on the contrary, is intended to cover various modifications and equivalent arrangements.

What is claimed is:

1. A group call service infrastructure within a telecommunication network comprising:
   a Push-to-Talk over Cellular (PoC) server which facilitates a PoC group call over a radio interface between different user equipment units in a defined group within said telecommunications network,
   wherein said PoC server handles a floor request from a requesting user equipment unit included in the group based on a media type associated with the floor request, wherein said floor request comprising a floor request message which includes an indication of the media type associated with the floor request or an indication of message size;
wherein said PoC server further comprising:
a queue wherein the PoC server queues the floor request from the requesting user equipment;
a floor request handler which prioritizes the floor request within the queue based on the media type; and
while the requesting user equipment receives a first service from the PoC server, a second media service which is associated with the queued floor request can be unloaded to the PoC server.

2. The group call service infrastructure according to claim 1, wherein the PoC server handles floor control messages and handles the floor request independently of application or transport protocols used to convey the floor control messages.

3. A method for providing a Push-to-Talk over Cellular (PoC) service, hosted by a telecommunications network server, which facilitates a PoC group call over a radio interface between different user equipment units in a defined group within the telecommunications network, comprising the steps of:
handling a PoC floor request from a requesting user equipment unit included in the group based on a media type associated with the floor request, wherein the floor request includes a floor request message which includes an indication of the media type associated with the PoC floor request;
prioritizing the PoC floor request from the requesting user equipment unit based on the media type and
queuing the PoC floor request from the requesting user equipment unit and prioritizing the PoC floor request within the queue based on the media type;
wherein while the requesting user equipment receives a first service from the telecommunications network server, a second media service associated with the queued request is unloaded to the telecommunication network server.

4. The method of claim 3, wherein said telecommunications network server includes floor control messages wherein the group call service handles the floor request independently of application or transport protocols used to convey the floor control messages.

5. The method according to claim 3, wherein the floor request comprises a floor request message which includes an indication of the media type associated with the floor request and/or an indication of message size.

6. A method of operating a Push-to-Talk over Cellular (PoC) service, hosted by a telecommunications network, which facilitates a PoC group call over a radio interface between different user equipment units in a defined group within the telecommunications network, comprising the steps of:
handling a PoC floor request from a requesting user equipment unit included in the group based on a media type associated with the PoC floor request, wherein the floor request comprises a floor request message including an indication of the media type associated with the floor request;
prioritizing the floor request from the requesting user equipment unit based on the media type, further comprising the steps of:
queuing the floor request from the requesting user equipment in a queue; and
prioritizing the floor request within the queue based on the media type; and wherein while receiving a first service by the requesting user equipment, uploading a second media service associated with the queued request message to the PoC server.

7. The method according to claim 6, wherein said telecommunications network includes floor control messages and further comprising handling the floor request independently of application or transport protocols used to convey the floor control messages.

8. The method according to claim 6, wherein the floor request comprises a floor request message, and wherein the method further comprises including in the floor request message an indication of message size.

* * * * *

UNITED STATES PATENT AND TRADEMARK OFFICE
CERTIFICATE OF CORRECTION

PATENT NO. : 7,593,359 B2 Page 1 of 1
APPLICATION NO. : 10/595641
DATED : September 22, 2009
INVENTOR(S) : Eneroth et al.

It is certified that error appears in the above-identified patent and that said Letters Patent is hereby corrected as shown below:

On the Title Page, in Item (57), under "ABSTRACT", in Column 2, Line 6, delete "(32j)" and insert -- ($30_j$) --, therefor.

In Column 6, Line 13, delete "30j." and insert -- $30_j$. --, therefor.

In Column 6, Line 23, delete "30j" and insert -- $30_j$ --, therefor.

In Column 7, Line 56, delete "his" and insert -- this --, therefor.

In Column 9, Line 60, delete "making." and insert -- making --, therefor.

In Column 10, Line 6, delete "GRPS" and insert -- GPRS --, therefor.

In Column 10, Line 9, delete "GRPS" and insert -- GPRS --, therefor.

In Column 10, Line 12, delete "GRPS" and insert -- GPRS --, therefor.

In Column 10, Line 24, delete "GRPS" and insert -- GPRS --, therefor.

In Column 12, Line 18, delete "Myraid" and insert -- Myriad --, therefor.

In Column 12, Line 54, delete "changed." and insert -- changed --, therefor.

In Column 12, Line 63, delete "Message-D:" and insert -- Message-ID: --, therefor.

In Column 13, Line 56, delete "interfer" and insert -- interfere --, therefor.

In Column 15, Line 11, in Claim 1, delete "unloaded" and insert -- uploaded --, therefor.

In Column 15, Line 37, in Claim 3, delete "unloaded" and insert -- uploaded --, therefor.

Signed and Sealed this

Nineteenth Day of January, 2010

David J. Kappos
*Director of the United States Patent and Trademark Office*